United States Patent [19]

Iwasaki et al.

[11] Patent Number: 4,527,170

[45] Date of Patent: Jul. 2, 1985

[54] INK JET WASTE AND REPLENISH INK SYSTEM

[75] Inventors: Kyuhachiro Iwasaki, Fujisawa; Minoru Ameyama, Yokohama; Yutaka Ebi, Kawasaki; Koichiro Jinnai, Kawasaki; Tsutomu Sato, Yokohama, all of Japan

[73] Assignee: Ricoh Company Ltd., Tokyo, Japan

[21] Appl. No.: 492,774

[22] Filed: May 9, 1983

[30] Foreign Application Priority Data

Jun. 17, 1982 [JP] Japan ............................... 57-104638

[51] Int. Cl.[3] ............................................ G01D 15/18

[52] U.S. Cl. ................................ 346/75; 346/140 R

[58] Field of Search ............................ 346/75, 140 R

[56] References Cited

U.S. PATENT DOCUMENTS 4,336,547 6/1982 Matsumoto ....................... 346/75 X 4,337,468 6/1982 Mizuno ........................... 346/1.1 X 4,346,388 8/1982 Wiley .................................. 346/75

4,434,428 2/1984 Horike ............................ 346/75 X 4,437,104 3/1984 Hudson ......................... 346/140 R

*Primary Examiner*—E. A. Goldberg

*Assistant Examiner*—Gerald E. Preston

*Attorney, Agent, or Firm*—David G. Alexander

[57] ABSTRACT

An ink jet printing apparatus is disclosed in which part of ink droplets ejected from a nozzle of an ink ejection head and unused for printing purpose is caught by a gutter and returned to an ink supply source through an ink circulation path to be reused. The ink is partly shunted for disposal while fresh ink is supplied to the ink supply source in proportion to the amount of ink disposal, thereby maintaining the ink viscosity always at a proper value. For the disposal of the ink, a three-way solenoid operated valve is opened periodically for a predetermined period of time or, alternatively, ink droplets ejected from the nozzle are deflected to be caught by a gutter which is independent of the first gutter for routing to disposal means. The amount of disposal is determined by a pressure of ink fed to the nozzle and/or a temperature of ink in the neighborhood of the nozzle.

11 Claims, 8 Drawing Figures

INK JET WASTE AND REPLENISH INK SYSTEM

BACKGROUND OF THE INVENTION

The present invention relates to an ink jet printing apparatus capable of controlling the viscosity of ink which is circulated therein and, more particularly, to an ink jet printer of the type which constantly or periodically discards a predetermined amount of ink and supplies the same amount of fresh ink to maintain the total ink viscosity within an allowable range.

In an ordinary ink jet printing apparatus, part of ink droplets ejected from an ink ejection head which does not contribute to data printout is caught by a gutter and collected thereby into an ink supply source for reuse. A problem has existed in such an apparatus in that the collected ink, which is the composition of droplets flown at a high speed through the space, has lost part of its volatile component during the flight of the droplets and thereby increases the ink density as a whole. In this manner, the content of the volatile component (solvent) in the ink decreases every time the ink is ejected from the nozzle as a result that the proportion of the nonvolatile component to the whole ink to be reused will progressively increase in the course of a long time of operation. The result will be an increase in the viscosity of the ink which prevents droplets to be formed adequately and eventually renders the apparatus inoperable.

To overcome this problem, there has been proposed a device which senses an ink voscosity and, upon increase thereof beyond a reference value, adds a diluted solution to the ink. Although successful to maintain a constant ink viscosity, such a prior art device makes the entire printer construction complicate due to the additional means for sensing an ink viscosity and means for supplying a diluted solution.

SUMMARY OF THE INVENTION

It is therefore an object of the present invention to provide an ink jet printing apparatus which is capable of printing out clear-cut images by improving the conditions for the separation of ink into droplets.

It is another object of the present invention to provide an ink jet printing apparatus which is capable of controlling the viscosity of ink ejected from a nozzle of an ink ejection head constantly to an allowable range.

It is another object of the present invention to provide an ink jet printing apparatus which, with a simple construction, suppresses as far as possible the increase in the viscosity of ink which is collected by a gutter to be allowed for reuse.

It is another object of the present invention to provide a generally improved ink jet printing apparatus.

An ink jet printing apparatus embodying the present invention collects part of ink ejected from a nozzle of an ink ejection head and unused for printing out dots on a sheet of paper into an ink supply source for reuse. The apparatus includes discarding means for collecting the ink for reuse and discarding the ink. Means is provided for supplying the ink supply source with fresh ink corresponding in amount to the discarded ink. The discarding means is controlled by control means to collect and discard the ink at a predetermined period for a predetermined period of time, whereby the viscosity of the ink ejected from the nozzle constantly remains within a predetermined allowable range.

In accordance with the present invention, an ink jet printing apparatus is constructed such that part of ink droplets ejected from a nozzle of an ink ejection head and unused for printing purpose is caught by a gutter and returned to an ink supply source through an ink circulation path to be reused. The ink is partly shunted for disposal while fresh ink is supplied to the ink supply source in proportion to the amount of ink disposal, thereby maintaining the ink viscosity always at a proper value. For the disposal of the ink, a three-way solenoid operated valve is opened periodically for a predetermined period of time or, alternatively, ink droplets ejected from the nozzle are deflected to be caught by a gutter which is independent of the first gutter for routing to disposal means. The amount of disposal is determined by a pressure of ink fed to the nozzle and/or a temperature of ink in the neighborhood of the nozzle.

The above and other objects, features and advantages of the present invention will become apparent from the following detailed description taken with the accompanying drawings.

DESCRIPTION OF THE PREFERRED EMBODIMENTS

While the ink jet printing apparatus of the present invention is susceptible of numerous physical embodiments, depending upon the environment and requirements of use, substantial numbers of the herein shown and described embodiments have been made, tested and used, and all have performed in an eminently satisfactory manner.

Figure 1:
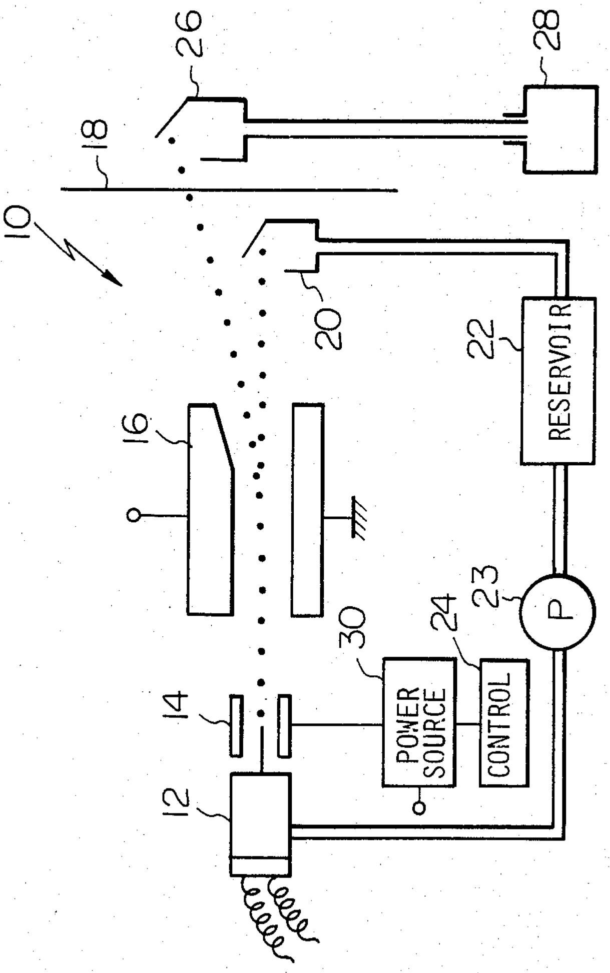
FIG. 1 is a schematic diagram of an ink jet printer embodying the present invention.

Referring to FIG. 1 of the drawings, an ink jet printing apparatus embodying the present invention is shown and generally designated by the reference numeral 10. In the ink jet printer 10, an ink ejection head 12 ejects droplets of ink which are selectively charged by a charging electrode 14 and then deflected by deflecting electrodes 16. The charged and deflected droplets will print out dots on a sheet of paper 18. The other droplets unused for printing purpose are caught by a gutter 20 to be collected into an ink reservoir 22. A pump 23 compresses the collected ink and feeds it to the head 12 for reuse. A cartridge (not shown) supplies the ink reservoir 22 with fresh ink so that the amount of ink therein may be kept constant.

Figure 2:
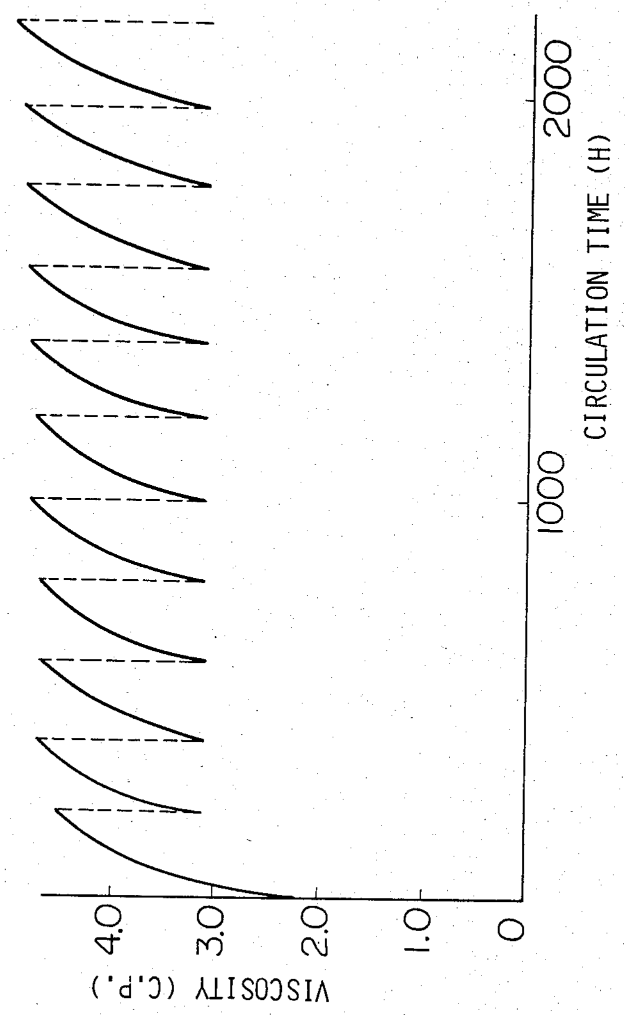
Fig. 2 PRIOR ART
FIG. 2 is a plot representing a variation in ink viscosity in accordance with a viscosity control effected by a prior art ink jet printer.

As previously discussed, as collected part of the ink is reused in the manner described, the total viscosity of the ink progressively increases as indicated by solid curves in FIG. 2. It will be noted in FIG. 2 that the dotted lines indicate decreases in ink viscosity which simply resulted from replacement of the ink cartridge. In accordance with the present invention, the printer 10 additionally includes a control circuit 24, a second gutter 26 located outside the range of the sheet 18, and a receptacle 28 for disposal. The control circuit 24 controls a power source 30 so that the charging electrode 14 may be supplied with a voltage of such a level which deflects droplets as far as the second gutter 26, periodically for a predetermined period of time. All the droplets so deflected will captured by the gutter 26 to be collected into the receptacle 28 and thereby removed from the ink circulation system.

Figure 3:
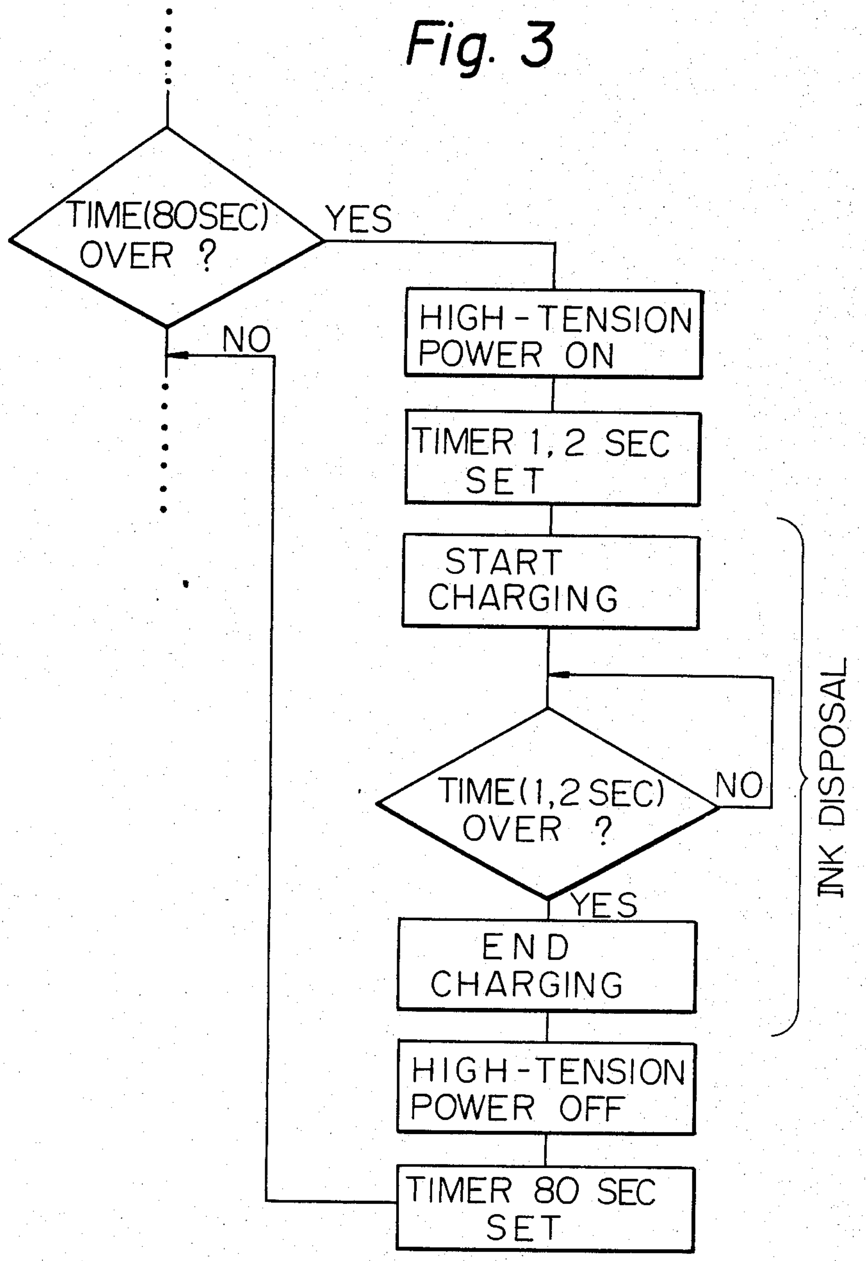
FIG. 3 is a flowchart demonstrating the operation of the printer shown in FIG. 1.
Figure 4:
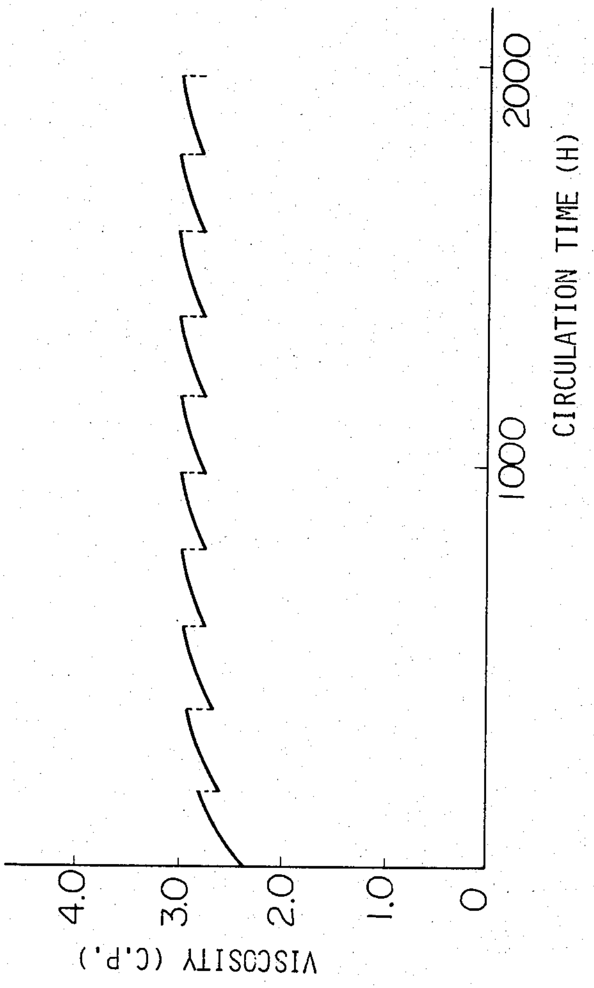
FIG. 4 is a plot representing a variation in ink viscosity in accordance with a viscosity control effected by an ink jet printer of the present invention.

Referring to FIG. 3, the flowchart demonstrates an operation of the ink jet printer 10 in which the interval or period of ink disposal is 80 seconds and the duration of a disposal is one to two seconds by way of example. When 80 seconds expires as counted by a timer (not shown), a high tension power source is turned on and the timer is set for a duration of one to two seconds. Then, the control circuit 24 starts applying the voltage of the specific level across the charging electrode 14, so that the ink is caught and removed by the gutter 26 for the duration of one to two seconds. Upon the lapse of this period of time, the timer is again loaded with 80 seconds while the usual printout operation is resumed. As the ink is periodically removed for each predetermined period of time by the proportion which contributed to the increase in viscosity, the cartridge supplies fresh ink by the equal amount thereby suppressing the increase in viscosity as a whole. This will maintain the viscosity within a given allowable range as shown in FIG. 4.

If desired, an arrangement may be made such that the disposal of ink occurs continuously without any interval instead of the periodic disposal described hereinabove.

Figure 5:
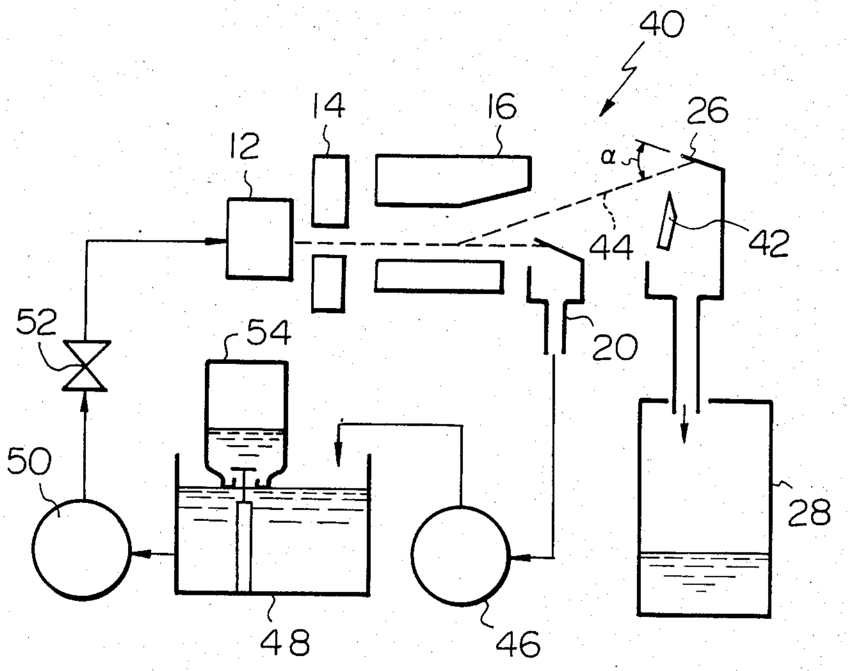
FIG. 5 is a schematic diagram of a second embodiment of the present invention.

Referring to FIG. 5, an ink jet printer 40 in accordance with another embodiment of the present invention is shown. A characteristic feature of this printer 40 is that an electrode 42 is disposed in the gutter 26 in order to detect an amount of deflection. Usually, the deflection of ink by the deflection electrodes 16 is influenced by a variation in the flow rate of ink from the pump to the head 12 and that in the ambient conditions. Hence, such an ink jet printer as one of this embodiment is constructed to direct ink toward the electrode 42 once for several tens to several hundreds of seconds, thereby detecting and suitably compensating for a change in deflection if any.

Thus, in the embodiment shown in FIG. 5, ink droplets 44 used for the detection and compensation of a deflection are collected into the receptacle 28 at the intervals of several tens to several hundreds of seconds. Preferably, an acute angle $\alpha$ is defined between the path of the ink droplets 44 and the gutter 26 so as to prevent mist from forming in the gutter 26. This also holds true in the embodiment shown in FIG. 1. The unused droplets caught by the gutter 20 are fed by a pump 46 to an ink reservoir 48. Ink in the reservoir 48 is supplied therefrom by a pump 50 to the head 12 via a solenoid operated valve 52. As the ink in the reservoir is consumed, a cartridge 54 supplies fresh ink into the reservoir 48 in response to the resulting drop of the liquid level.

Figure 6:
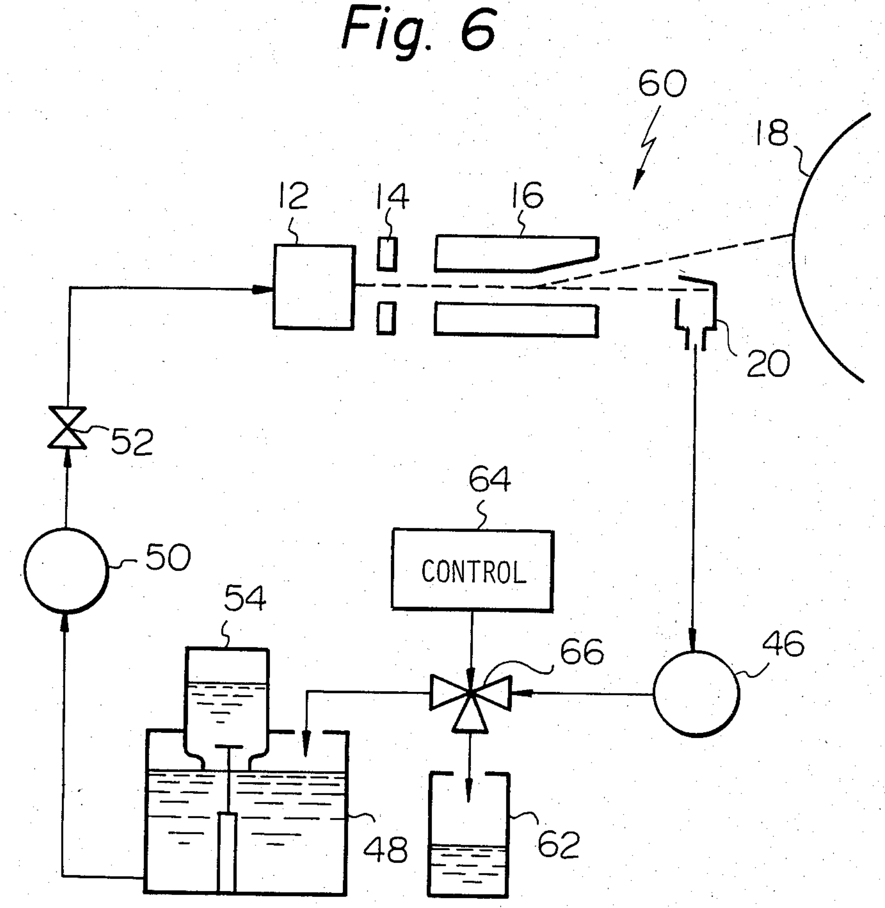
FIG. 6 is a schematic diagram of a third embodiment of the present invention.

A third embodiment of the present invention will be described with reference to FIG. 6. The printer, generally 60, employs a control unit 64 and a three-way solenoid operated valve 66 for the purpose of routing the ink collected by the gutter 20 partly into a receptacle 62 for disposal via the pump 46.

When the valve 66 is turned off by the control unit 64, it will pass the ink coming out of the pump 46 to the reservoir 48. When the valve 66 is turned on, it will shunt the ink to the receptacle 62. It will be seen that the ink viscosity is maintained lower than a reference value by designing the ratio of the on-time to the off-time of the valve 66 larger than a certain value.

Figure 7:
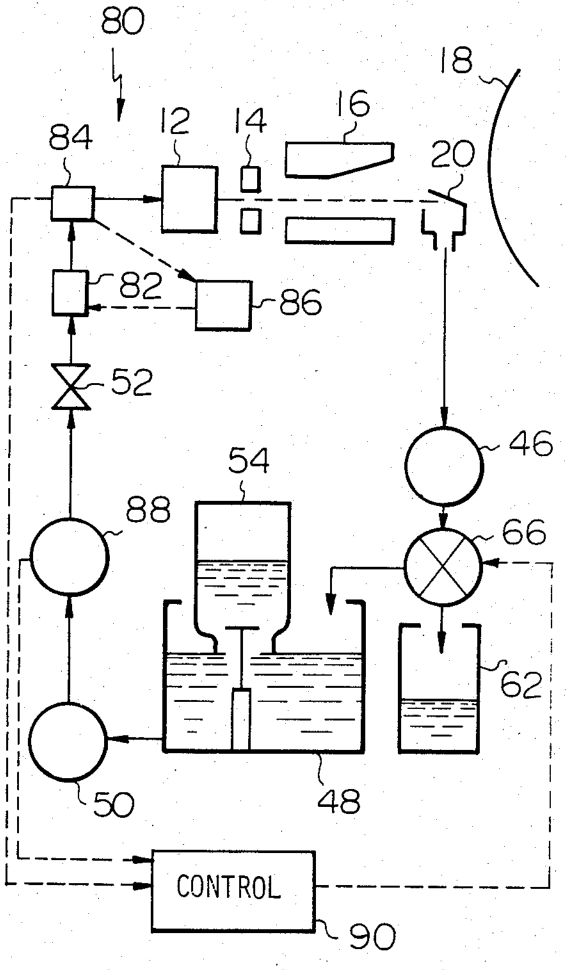
FIG. 7 is a schematic diagram of a fourth embodiment of the present invention.

Referring to FIG. 7, a fourth embodiment of the present invention is shown. An ink jet printer 80 of FIG. 7 is constructed such that ink fed to the reservoir 48 is compressed by the pump 50 into a heater 82 via the valve 52 and thereby heated to a predetermined temperature before fed to the head 12. The flow rate of the ink fed under pressure from the pump 50 to the head 12 remains constant. A temperature sensor 84 constantly senses a temperature of the ink. When the ink temperature is lowered beyond a level $T_2$ (see FIG. 8), the heater 82 is activated to heat the ink. A heater control circuit 86 controls the heater 82 so that the ink temperature remains at the level $T_2$.

Figure 8:
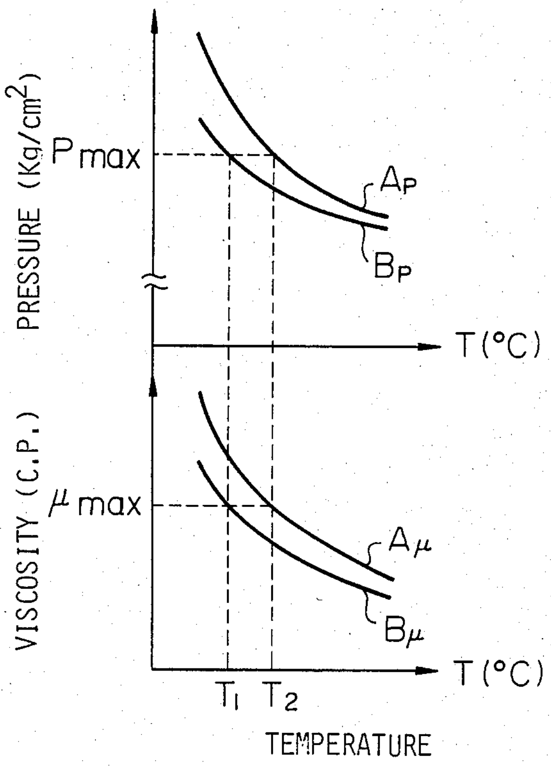
FIG. 8 is a plot showing dependency of the viscosity and pressure of ink upon the temperature thereof.

Suppose an upper limit $\mu$max of ink viscosity which allows ink ejected from the head 12 to adequately separate into droplets. Then, as shown in FIG. 8, the ink pressure will be Pmax when sensed by a pressure sensor 88 because the ink outflows the pump 50 at a constant flow rate, that is, the pump 50 comprises a constant flow type pump. In FIG. 8, a curve B$\mu$ represents the viscosity to temperature characteristic of standard ink and a curve Bp, a pressure characteristic corresponding to the curve B$\mu$. While the ink temperature is low, adequate separation of ink into droplets is unattainable and, therefore, ink is generally heated up to the level $T_2$ by the heater 82. At the temperature $T_2$, ink will reach a limit of the allowable viscosity characteristic as indicated by a curve A$\mu$ and a pressure characteristic corresponding thereto, as indicated by a curve Ap. It follows that the ink viscosity has to be controlled to lie somewhere between the curves A$\mu$ and B$\mu$.

Such a demand is implemented by the printer 80 of FIG. 7 in which, when the pressure sensor 88 has detected a pressure higher than the upper limit Pmax shown in FIG. 8, a control circuit 90 opens the three-way valve 66 for a predetermined period of time thereby routing the ink collected by the gutter 20 into the receptacle 62 for disposal.

This permits the ink supply pressure to be controlled to the range between the curves Ap and Bp of FIG. 8.

If desired, the characteristic represented by the curve Ap in FIG. 8 may be stored in the control 90 so that the valve 66 will be opened to discard the collected ink when the outputs of both the pressure sensor 88 and temperature sensor 84 lie above the curve Ap. Also, the open time of the valve 66 may be controlled in response to a difference between the outputs of the pressure sensor 88 and temperature sensor 84 and the curve Ap. In another alternative construction, the valve 66 may be opened to pass the collected ink to the receptacle 62 upon the rise of the output of the pressure sensor 88 beyond the Pmax level. In such an alternative, the open time of the valve 66 may be controlled by the control 90 in accordance with an output of the temperature sensor 84.

Various modifications will become possible for those skilled in the art after receiving the teachings of the present disclosure without departing from the scope thereof.

What is claimed is:

1. An ink jet printing apparatus including an ink ejection head for ejecting a jet of ink and print control means for causing ink droplets from the ink jet to impinge on a sheet for printing, characterized by comprising:

an ink supply source for supplying the ink to the ink ejection head;

collecting means for collecting ink droplets from the ink jet which are not used for printing;

ink discarding means, the collecting means feeding a predetermined amount of said collected ink to the ink discarding means for discarding and feeding the remaining amount of said collected ink to the ink supply source for reuse; and means for feeding to the ink supply source an amount of ink equal to the amount of discarded ink.

2. An ink jet printing apparatus as claimed in claim 1, in which the collecting means comprises a first gutter leading to the ink supply source, a second gutter leading to the discarding means and deflection control means for selectively deflecting the ink jet to the sheet for printing; to the first gutter for non-printing and reuse; or to the second gutter for discarding.

3. An ink jet printing apparatus as claimed in claim 2, in which, within a first predetermined period of time comprising a second predetermined period of time and a third predetermined period of time, the deflection control means selectively deflects the ink jet to the sheet for printing or to the first gutter for non-printing during the second predetermined period of time; the deflection control means deflecting the ink jet to the second gutter for discarding during the third predetermined period of time.

4. An ink jet printing apparatus as claimed in claim 3, in which the first predetermined period of time is 80 seconds and the third predetermined period of time is one to two seconds.

5. An ink jet printing apparatus as claimed in claim 2, in which the second gutter comprises a deflection detecting electrode, the deflection control means are operatively connected to the deflection detecting electrode in such a manner that ink ejected to the second gutter is controlled to impinge on the deflection detecting electrode.

6. An ink jet printing apparatus as claimed in claim 1, in which the collecting means comprises a gutter, deflection control means for deflecting said ink droplets which are not used for printing to the gutter and valve means for selectively connecting the gutter to one of the ink supply source and the ink discarding means.

7. An ink jet printing apparatus as claimed in claim 6, further comprising control means constructed to operate such that, within a first predetermined period of time comprising a second predetermined period of time and a third predetermined period of time, the control means controls the valve means to connect the gutter to the ink supply source during the second predetermined period of time and to the discarding means during the third predetermined period of time.

8. An ink jet printing apparatus as claimed in claim 6, further comprising temperature sensor means for sensing a temperature of ink in the ink ejection head and control means for controlling the valve means to connect the gutter to one of the ink supply means and the discarding means in response to a predetermined function of sensed temperature.

9. An ink jet printing apparatus as claimed in claim 8, in which the control means controls the valve means to connect the gutter to the ink supply means when the sensed temperature is above a predetermined value and to the discarding means for a predetermined period of time when the sensed temperature is below the predetermined value.

10. An ink jet printing apparatus as claimed in claim 6, further comprising pressure sensor means for sensing a pressure of ink supplied to the ink ejection head and control means for controlling the valve means to connect the gutter to one of the ink supply means and the discarding means in response to a predetermined function of sensed pressure.

11. An ink jet printing apparatus as claimed in claim 10, in which the control means controls the valve means to connect the gutter to the ink supply means when the sensed pressure is below a predetermined value and to the discarding means for a predetermined period of time when the sensed pressure is above the predetermined value.

* * * * *